3,383,173
AMMONIA PURIFICATION
Walter M. Bollen, San Rafael, Calif., assignor to Chevron Research Company, San Francisco, Calif., a corporation of Delaware
Filed Dec. 30, 1965, Ser. No. 517,628
5 Claims. (Cl. 23—196)

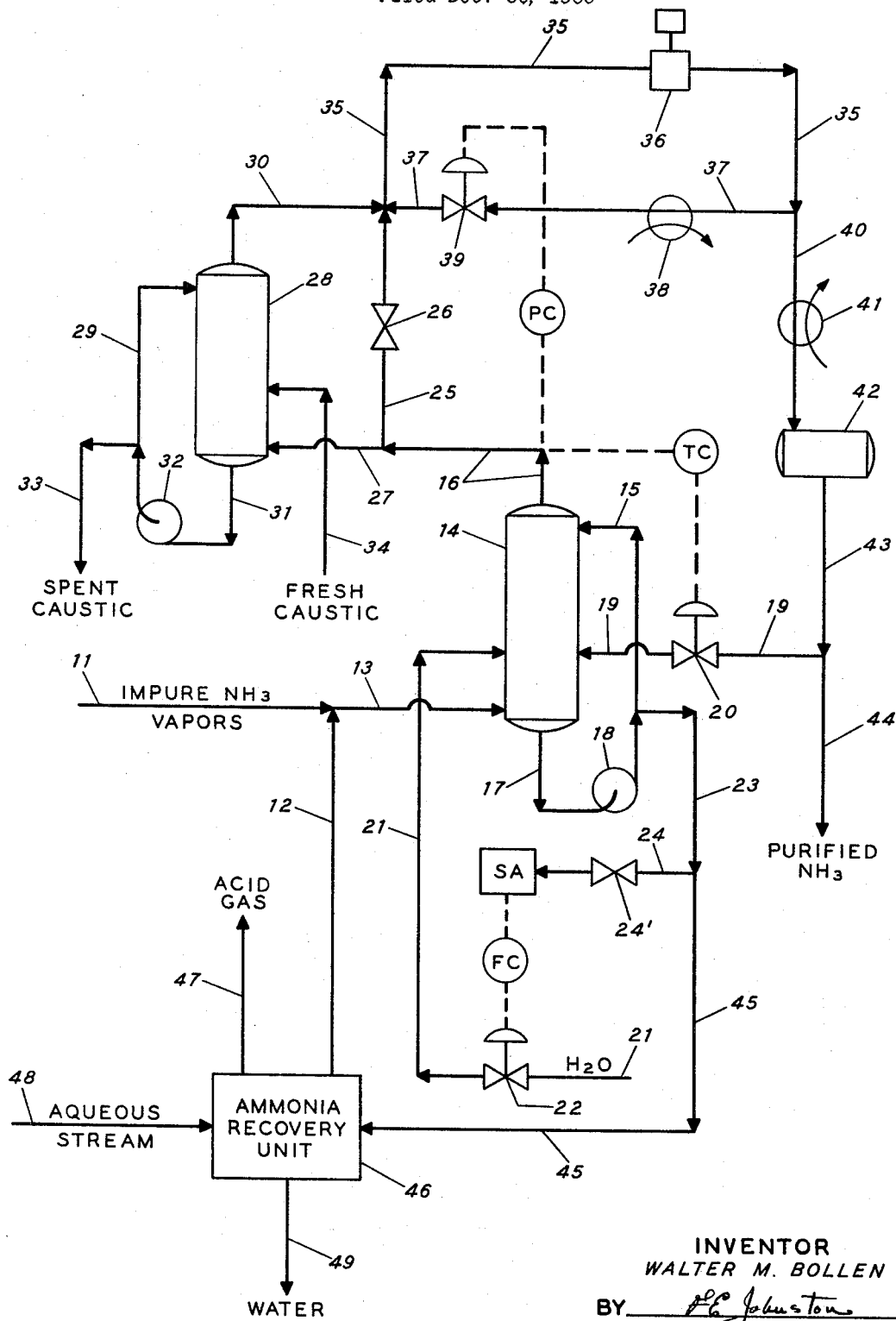

ABSTRACT OF THE DISCLOSURE

Acid gas contaminants are removed from an impure vapor stream, which is mostly ammonia, by scrubbing the vapor stream in a contactor at low temperature and superatmospheric pressure with a concentrated aqua ammonia solution formed by flashing liquid ammonia supplied at a higher pressure into said contactor at a rate regulated to maintain a substantially constant low temperature and by adding water into the contactor at a rate regulated to maintain a high mole ratio of ammonia to acid gas in the resulting solution. Purified ammonia vapors are withdrawn from the contactor at a rate regulated to maintain substantially constant superatmospheric pressure.

---

This application relates to the treatment of ammonia vapors, and more particularly it relates to processes for removing acid gas contaminants from impure vapor streams which are mostly ammonia. Still more particularly, the invention relates to the treatment of ammonia-rich vapors contaminated with minor amounts of acid gas and water to produce purified ammonia vapors.

It is known to scrub streams containing one or more of the acid gases, hydrogen sulfide and carbon dioxide, with ammoniacal solutions and to regenerate the ammoniacal solution for reuse by driving off the acid gas. Some acid gas must be left fixed with the ammonia in the solution to be reused as the components cannot be completely separated by stripping or simple distillation without producing a mixture of acid gas and ammonia. When scrubbing streams which already contain ammonia in addition to the acid gas, ammonia will be picked up in the ammoniacal solution along with the acid gas. For example, in the treatment of coke oven gases containing both $H_2S$ and $NH_3$ with an ammoniacal solution, the resulting ammoniacal solution containing dissolved $H_2S$ and an increased amount of $NH_3$ is first heated to drive off a major portion of the $H_2S$ as a relatively pure stream, and the remaining solution is then further treated as by stripping or boiling to drive off the net amount of $NH_3$ picked up as a mixture of $NH_3$ with the rest of the net $H_2S$ picked up, which mixture also contains water. Similarly, $CO_2$ appears as a contaminant in $NH_3$ streams in urea manufacturing processes, and in other chemical processes both $CO_2$ and $H_2S$ may be present as contaminating byproducts in an ammoniacal reagent. In many cases it would be desirable to be able to recover or separate the ammonia in a pure form.

With the advent of increased utilization of catalytic hydrogen treating of petroleum fractions there are becoming available increased amounts of mixtures of hydrogen sulfide, ammonia, and water. The $H_2S$ and $NH_3$ are produced as byproducts of the hydrogenation of naturally-occurring organic sulfur and nitrogen compounds found in most crude hydrocarbon oils. In a recently developed process a hydrocarbon stream containing $H_2S$ and $NH_3$, such as is formed by treating an oil with hydrogen, is scrubbed with water forming an aqueous solution of ammonium sulfide or bisulfide, which may contain excess ammonia, and the ammonia and hydrogen sulfide are separately recovered from this aqueous solution. In the process for recovering the ammonia and $H_2S$ an ammonia-rich vapor stream is formed, for example by vaporization of a portion of the solution from which $H_2S$ has already been driven off and partially condensing the resulting vapors, which may be done in repeated stages. By proceeding in this way it is possible to produce ammonia vapors in a high state of purity, but problems may arise if the composition of the aqueous solution and, as a result, the composition of the vapor stream undergoing partial condensation vary.

When a vapor stream which is mostly ammonia containing a minor amount of acid gas and water contains substantially more water than acid gas, partial condensation of the vapor can preferentially remove the acid gas in the resulting liquid condensate. When, however, such an impure vapor stream comprising mostly ammonia contains about the same amount of acid gas as water, or more acid gas than water, partial condensation can preferentially remove the water, leaving most of the acid gas still contaminating the uncondensed ammonia vapors. Further attempts at purification by repeated partial condensation may lead to the production of a nearly dry gas and the precipitation of solid salts of ammonia and acid gas, plugging the equipment and lines. Some of these problems may be avoided by adjusting the conditions of temperature and pressure at which the partial condensation is carried out depending on the relative amounts of water and acid gas in the ammonia-rich vapors, but this may require continual adjustment in a case where the solution and/or vapor compositions may vary as a result of variations in the composition of the stream being treated or because of the inability to maintain other process conditions constant.

The present invention provides a process or method whereby the above-mentioned difficulties can be obviated so as to remove acid gas contaminants from an impure vapor stream which is mostly ammonia to obtain a purified vapor stream comprising mostly ammonia containing no more than a fixed small concentration of acid gas despite variations in the relative amounts of acid gas and/or water in the impure vapor stream.

It is desirable to produce a purified vapor stream comprising mostly ammonia containing no more than a fixed small concentration of acid gas in that it is found economical to remove small traces of acid gas, where a highly pure ammonia product is desired, by caustic scrubbing. Ammonia is surprisingly soluble in dilute caustic, and accordingly it is desirable to use a concentrated caustic solution for the scrubbing. The use of a concentrated caustic solution is also desirable to avoid unduly increasing the water content of the purified ammonia product, and for the same reason it is desirable to use a low temperature in the caustic scrubbing. Also, ammonia solubility in caustic increases with temperature. Under the conditions of employing a concentrated caustic solution at low temperature there is a danger of the resulting alkali metal salt of the acid gas solidifying or precipitating from the caustic, thereby plugging up the equipment. Such a problem is readily avoided if the acid gas content of the ammonia vapors undergoing treatment remains constant and small so that the rate of utilization of caustic can easily be followed. Problems arise when the amount of acid gas required to be removed from the vapor stream by the caustic varies from time to time, particularly if it may periodically increase substantially above the concentrations for which the unit was designed.

The present invention provides a process for removing an acid gas contaminant from an impure vapor stream which is mostly ammonia containing minor variable amounts of acid gas and water to produce a purified vapor stream comprising mostly ammonia containing no more than a small fixed concentration of acid gas and a small variable amount of water. In accordance with the invention the impure vapor stream is passed into a contactor wherein it is scrubbed at low temperature and superatmospheric pressure with a concentrated aqua ammonia solution formed by flashing liquid ammonia supplied at a higher pressure into said contactor at a rate regulated to maintain substantially constant the low temperature and by adding water into the contactor at a rate regulated to maintain a substantially constant high mol ratio of ammonia to acid gas in the resulting solution. A purified vapor stream comprising mostly ammonia containing a small fixed concentration of acid gas and a small variable amount of water is withdrawn from the contactor at a rate regulated to maintain substantially constant the superatmospheric pressure in the contactor, and there is separately withdrawn from the contactor a portion of the solution containing acid gas removed from the impure vapor stream.

The mol ratio of ammonia to acid gas in the solution is maintained sufficiently high and constant such that the vapor pressure contribution of the acid gas is negligible compared to the vapor pressure contribution of the ammonia and water at the temperature and pressure employed. Using regulation of the rate of water addition to control the ratio of ammonia to acid gas in the concentrated aqua ammonia solution is only possible if there is ample ammonia present and the pressure and temperature are controlled constant. Using the flashing of added ammonia supplied at a higher pressure to control the temperature, by the cooling effect of auto-refrigeration of the added ammonia, makes sure that there is ample ammonia present in the system. Controlling the pressure by regulating the rate of withdrawing purified vapors makes certain that too much water is not added. That is, the water abstracts ammonia from the vapor, and if the pressure were not controlled, the desired ratio of ammonia to acid gas might still be achieved in the solution, but too dilute an aqueous ammonia solution might result.

The acid gas contaminants which may be removed from impure ammonia vapor streams in the process of this invention include hydrogen sulfide and carbon dioxide. The impure vapor stream may contain one or both of these acid gases. The vapor stream treated must however be mostly ammonia, more particularly greater than 80% ammonia and more desirably at least 90% or more ammonia. The process does not operate in the described manner if the impulse vapor stream is mostly water or acid gas, and its advantages are lost if the vapor stream contains too much water or acid gas. The acid gas and water should be present in only minor variable amounts, less than 10% acid gas and less than 10% water, and the greatest benefits are achieved in treating $NH_3$ vapors containing less than 5% acid gas. References to relative amounts and percentages of components above and hereinafter are on a molar basis unless otherwise stated.

The contactor in which the impure vapor stream is contacted with a concentrated aqua ammonia solution may comprise any suitable device for accomplishing intimate contacting between liquid and vapor. Most suitably, the solution is continuously circulated into and out of contact with upflowing vapor in a vessel equipped with packing or other vapor-liquid distributing devices such as trays or baffles. A close approach to equilibrium between the vapor and liquid is needed for most effective use of the process.

The contacting is carried out at substantially constant low temperature, which must not be too near the freezing point of the solution and should not be so high as to induce a substantial vapor pressure of acid gas. Suitable temperature conditions include temperatures of from 0 to 100° F. Corresponding to the low temperature there is maintained a substantially constant superatmospheric pressure corresponding closely to that attributable only to the vapor pressures of ammonia and water at the temperature. Suitable pressures include those in the range of 1 to 150 p.s.i.g.

The concentrated aqua ammonia solution used for the scrubbing contains ammonia combined with the acid gas absorbed and also sufficient additional free ammonia to be saturated at the temperature and pressure conditions. The solution should contain at least as much ammonia as water, and preferably two or more times as much ammonia as water. In the practice of the invention the ratio of ammonia to water in the aqueous solution will be lower than or equal to the ratio of ammonia to water in the impure vapor stream being treated.

The concentrated aqua ammonia solution is formed by ammonia and water condensed from the impure vapor stream and also hydrogen sulfide abstracted therefrom, by liquid ammonia supplied at a higher pressure and flashed into the contacting zone to accomplish the needed cooling by autorefrigeration to maintain the temperature substantially constant, and by the addition of water at the rate regulated to maintain a substantially constant high mol ratio of ammonia to acid gas in the solution. In general, the mol ratio of ammonia to acid gas maintained in the solution should be above 5 to 1, at least 20 to 1 when it is desired to recover a purified ammonia vapor stream containing less than 1000 wt. p.p.m. acid gas. For example, where the acid gas is hydrogen sulfide a mole ratio of $NH_3$ to $H_2S$ of slightly above 30 to 1 can be used to produce a purified ammonia vapor stream containing less than 100 p.p.m. $H_2S$ by weight based on $NH_3$ on a dry basis, at a temperature of about 45° F. and a pressure of about 45 p.s.i.g. Higher ratios are needed at higher temperatures and at lower pressures.

The purified vapor stream recovered comprises mostly ammonia purified with respect to acid gas contamination. The vapor may contain small and variable amounts of water, but the water is easily removed as by redistillation or by compression and partial condensation if it is desired to produce an anhydrous ammonia vapor stream.

The acid gas cannot be completely removed from the ammonia in an absolute sense by the process of this invention, but the acid gas concentration in the ammonia can be lowered to below the minimum levels of detection. Usually, where the contaminant is $H_2S$ it is satisfactory to produce a purified ammonia stream containing a small fixed concentration of hydrogen sulfide of less than 1000 wt. p.p.m. The process is particularly useful where a highly pure product is desired, to produce $NH_3$ containing no more than 100 wt. p.p.m. $H_2S$ on a dry basis from vapors containing above 0.1 wt. percent $H_2S$.

As indicated, the purified ammonia vapor stream will contain a small variable amount of water, which will usually be less than 2% but may range upwards of 3% even at preferred operating conditions, but will generally be less than 5% unless the process is intentionally operated to produce a wet ammonia product.

A portion of the aqua ammonia solution containing the acid gas removed from the impure vapor stream must be withdrawn from the contacting zone to maintain a material balance, but this withdrawal may be either periodic or continuous. It is convenient to maintain a substantial inventory of aqua ammonia solution in the contacting zone, particularly when a circulating reflux contactor type of device is employed, and the inventory may be permitted to vary as solution is withdrawn more or less rapidly.

Referring now to the attached drawing, there is shown schematically one suitable flow scheme and arrangement of equipment which may be used for carrying out the process of this invention.

As shown in the drawing, an impure vapor stream which is mostly ammonia containing minor variable amounts of acid gas and water in line 13 is formed by the combination of other impure ammonia vapor streams in lines 11 and 12. The vapor is passed to contactor 14 which suitably contains a bed of packing or liquid distributing trays above the point of vapor injection, and the vapor is contacted countercurrently while rising through zone 14 with a concentrated aqua ammonia solution introduced above the packing material through line 15. The concentrated aqua ammonia solution removes acid gas from the rising vapors so that there is obtained in line 16 a purified vapor stream comprising mostly ammonia containing a small fixed concentration of acid gas and a small variable amount of water. The aqua ammonia solution contining acid gas removed from the vapor is withdrawn from the bottom of contactor 14 through line 17 and circulated back through line 15 by pump 18.

The concentrated aqua ammonia solution employed in the contacting is formed in part from a mixture of liquid and vaporized ammonia injected through line 19 at a low temperature achieved by flashing liquid ammonia supplied at a higher pressure through valve 20. As indicated, the rate of flow through valve 20 is regulated in response to the temperature desirably maintained constant in the contactor, shown by TC as being measured in the vapor line 16.

The concentrated aqua ammonia solution is also formed in part from water injected through line 21 into contactor 14 at a rate regulated by valve 22 so as to maintain a substantially constant high ratio of ammonia to acid gas in the solution. A portion of the concentrated aqua ammonia solution containing acid gas absorbed from the vapor is withdrawn through line 23, and a sample thereof may be withdrawn via valve 24' in sample line 24 for analysis to determine the ratio of ammonia to acid gas therein. The analytical service is indicated by the box labeled SA, which may comprise a laboratory analysis carried out on samples periodically obtained, or it may be a continuous stream analyzer wherein the amounts of ammonia and acid gas are determined by continuous titration or other known manner. Either automatically or manually, in response to the measured ratio, the setting of valve 22 is adjusted, as shown by FC. The valve is opened to increase the rate of water addition if the ratio of ammonia to acid gas indicated in the sample is lower than the desired substantially constant high ratio.

By proceeding in this way, it is possible to produce in vapor line 16 a purified vapor stream which is mostly ammonia containing a small fixed concentration of acid gas and a small variable amount of water. The acid gas concentration may be sufficiently low such that this gas can be diverted through line 25 by opening valve 26 to ammonia compression facilities described hereinafter. Frequently, it is desired to virtually completely eliminate the small remaining amount of acid gas so as to produce ammonia containing essentially nil of the contaminant. In that case the purified ammonia vapor stream is passed via line 27 to contacting zone 28 wherein it is scrubbed with a concentrated caustic solution introduced through line 19. The caustic picks up the small amount of acid gas, is withdrawn from the bottom of contactor 28 through line 31, and may be recirculated through line 29 by means of pump 32. An inventory of partially spent caustic is maintained in the system, and the amount of spent caustic needed to be withdrawn to eliminate the acid gas removed may be intermittently or continuously withdrawn through line 33. A corresponding amount of fresh caustic is intermittently or continuously added through line 34. The purified ammonia vapors thus obtained in line 30 will contain nil acid gas, but may contain an increased concentration of water as compared to the vapor in line 16 depending on the conditions employed in the caustic contacting. As indicated previously, it is desirable to use as low a temperature as practical in the caustic contacting to minimize ammonia losses in the caustic solution and to minimize water picked up by the ammonia vapors, consistent with avoiding solids formation. Similarly, it is desirable to use a low pressure to minimize ammonia losses, but this must be balanced against the compression work required.

As indicated, the purified ammonia vapors in line 30 or line 25 are combined with a circulated ammonia vapor stream in line 37 and passed through line 35 containing compressor 36. Line 37 represents a bypass from the discharge to the suction side of compressor 36 and contains a cooler 38 to control suction gas temperature and avoid overheating the machine, and a regulating valve 39 used to maintain a substantially constant suction pressure and thereby maintain a substantially constant pressure in contacting zone 14. This is indicated by PC responding to the indicated pressure in vapor line 16. If the pressure in contactor 14 tends to drop, valve 39 opens so that more material is bypassed through line 37 and the compressor operates at constant suction conditions with constant gross throughput but reduced net throughput. The net amount of compressed ammonia vapors in line 40 is condensed in heat exchanger 41 and collected as a liquid in drum 42. The liquid is withdrawn through line 43, a portion thereof being diverted through valve 20 in line 19 to contactor 14, while the net production of purified ammonia is recovered through line 44.

The variables temperature, pressure, and composition of the ammonia scrubbing solution have independent and interrelated effects on the purified vapor composition, and control of these effects by regulating water and ammonia injection and vapor withdrawal is accomplished in accordance with the invention in several ways, including the following.

If too much water is being added, the pressure tends to drop because ammonia is being extracted from the vapor. In response less vapor is withdrawn so that ammonia continues to be supplied more rapidly than it is withdrawn, thereby causing the ratio of ammonia to acid gas in the solution to increase. In response to the detected higher ratio of ammonia to acid gas, the rate of adding water is decreased.

If ammonia is being added too rapidly for cooling, the temperature tends to drop, and the rate of addition can automatically be decreased. If, however, there were also being added too much water at the same time, this would prevent the temperature from dropping. The continued addition of too much ammonia would prevent the pressure from dropping. However the ratio of ammonia to acid gas in the solution would necessarily increase, and accordingly the rate of water injection would be decreased. As a result the pressure would tend to increase and the temperature would tend to decrease, resulting in an increased rate of vapor withdrawal and a decreased rate of ammonia injection.

If the incoming vapor and water streams were at sufficiently low temperatures such that the amount of ammonia injection needed to control at the low temperature were insufficient to provide the desired high ammonia to acid gas ratio in the solution, the pressure control point would also not be achieved. As a result more ammonia would be retained in the system until the pressure built up and the required high ratio of ammonia to acid gas in the solution were obtained. It will be noted that the unit does not effectively operate in this manner if the impure ammonia vapor stream contains too much acid gas. Also, the temperature in the contactor must be lower than that of the impure vapor feed.

If insufficient water is being added, the total system pressure will tend to increase and there will be an increased rate of vapor withdrawal from the contactor, which vapor however will be contaminated with acid gas. Thus it is necessary to monitor the ratio of ammonia to acid gas in the solution, and it is advisable to operate with more than sufficient water always being added so as to always have greater than the minimum ratio of ammonia to acid gas in the solution needed to insure not exceeding the maximum small concentration of acid gas permissible in the ammonia product.

Referring again to the drawing, to avoid the purification of the ammonia vapors being accompanied by a substantial yield loss of ammonia it is desirable to further recover ammonia from the portion of the aqueous ammoniacal solution withdrawn through line 23. Accordingly, this solution is passed through line 45 to ammonia recovery facilities shown as block 46. Various techniques may be employed in recovering the ammonia, and accordingly details thereof are not shown. A highly satisfactory method comprises partially vaporizing the withdrawn portion of solution in line 45 by heating to form ammonia-rich vapors containing only a minor portion of the acid gas contained in the withdrawn portion, and treating the ammonia-rich vapors as a portion of the impure vapor stream, as indicated by line 12. Recovery of additional ammonia may be accomplished by adding water to the portion of the withdrawn solution which did not vaporize when heated in zone 46, which unvaporized portion contains the major portion of the acid gas in the withdrawn solution, and stripping acid gas from the water-enriched portion at a higher temperature and pressure. The acid gas is shown as recovered through line 47. The addition of water to the unvaporized portion of the withdrawn solution to facilitate stripping of acid gas therefrom is shown by line 48. The net amount of water introduced is withdrawn as by line 49.

The aqueous stream of line 48 may in many cases comprise an aqueous solution containing both ammonia and hydrogen sulfide, from which it is desired to produce ammonia-rich vapors for treatment in accordance with the invention. Thus, the stripping out of acid gas, from a mixture of the aqueous stream 48 and the unvaporized portion of the solution withdrawn from contactor 14 and partially vaporized to produce the vapors in line 12, will produce an aqueous stream containing more ammonia than acid gas. This stream may then be subjected to further boiling and stripping to obtain a vapor mixture of ammonia, acid gas, and water, which on partial condensation will yield ammonia-rich vapors which can be combined with the vapors in line 12.

The following example presents suitable operating conditions which can be employed and a material balance illustrating the degree of purification and separation which can be achieved by the practice of the invention, wherein an impure vapor stream comprising mostly ammonia contaminated with hydrogen sulfide and water is treated.

EXAMPLE

In this example an impure vapor stream is supplied at a temperature of 100° F. and a pressure of just slightly over 45 p.s.i.g., and is treated in contactor 14 of the drawing at a temperature of 45° F. and a pressure of 45 p.s.i.g. with a circulating concentrated aqua ammonia solution wherein the ratio of ammonia to hydrogen sulfide is maintained at between 30 and 32 mols of ammonia per mol of hydrogen sulfide. The solution is circulated at the rate of 3 liquid volumes per vapor volume. The following is a material balance wherein the stream numbers have reference to those shown in the drawing.

| Stream No. | Composition, Pounds | | |
|---|---|---|---|
| | $NH_3$ | $H_2S$ | $H_2O$ |
| 11 | 1,000 | 9 | 5 |
| 12 | 152 | 1 | 1 |
| 13 | 1,152 | 10 | 6 |
| 19 | 260 | | 3 |
| 21 | | | 34 |
| 16 | 1,260 | 0.1 | 1 |
| 44 | 998 | | 12 |
| 23–45 | 152 | 10 | 42 |
| 47 | | 9 | |
| 48 | | | 950 |
| 49 | | | 991 |

In the above tabulation the vapor feed represents vapors separated from an aqueous solution of 53% $NH_3$ and 11% $H_2S$, by weight, formed in the regeneration of an ammoniacal scrubbing solution for removing $H_2S$ from a gas also containing $NH_3$, as previously described. The ammonia free of $H_2S$ added as stream 19 is obtained by treating the vapors of stream 16 with 20° Bé. caustic at 70° F., which accounts for the small $NH_3$ loss and slightly increased water content in the net product of stream 44. The liquid ammonia product is recovered at about 100° F. and 200 p.s.i.g.

The foregoing example of stream compositions and operating conditions illustrates how the invention can be used to obtain highly purified ammonia vapors from ammonia vapors containing only one or two percent of acid gas and water contaminants, but it should be recognized that the exemplified conditions are nonlimiting in that other conditions may be found more advantageous in particular situations depending on the nature of the vapor feed, how much its composition may vary, and how pure a product is desired. In tests at a contacting temperature of 70° F. and just barely above atmospheric pressure the purified ammonia vapors contained about 375 wt. p.p.m. $H_2S$ when the mol ratio of $NH_3$ to $H_2S$ in the contacting solution was about 20, treating ammonia vapors containing 1.0 wt. percent $H_2S$ with the solution circulated at the rate of 3 liquid volumes per vapor volume.

I claim:

1. A process for removing an acid gas contaminant from an impure vapor stream which is mostly ammonia containing minor variable amounts of acid gas and water, which comprises passing said impure vapor stream into a contactor and therein scrubbing said vapor at constant low temperature and superatmospheric pressure with a concentrated aqua ammonia solution formed by flashing liquid ammonia supplied at a higher pressure into said contactor at a rate regulated to maintain said low temperature and adding water into said contactor at a rate regulated to maintain a substantially constant high mol ratio of ammonia to acid gas of at least 10 to 1 in said solution, withdrawing from said contactor a purified vapor stream comprising mostly ammonia containing no more than a small fixed concentration of acid gas and a small variable amount of water at a rate regulated to maintain said superatmospheric pressure in said contactor, and withdrawing a portion of said solution containing acid gas removed from said impure vapor stream.

2. A process in accordance with claim 1 wherein said impure vapor stream contains more acid gas than water and said purified vapor stream contains more water than acid gas, on a mol basis.

3. A process in accordance with claim 1 wherein said acid gas contaminant comprises $H_2S$, said impure vapor stream contains above 0.1 weight percent $H_2S$, and said purified vapor stream contains no more than 100 p.p.m. $H_2S$ by weight on a dry basis.

4. A process in accordance with claim 1 in combination with the additional steps comprising partially vaporizing the withdrawn portion of said solution by heating to form ammonia-rich vapors containing only a minor portion of the acid gas in said withdrawn portion, and treating said ammonia-rich vapors as a portion of said impure vapor stream.

5. A process in accordance with claim 1 in combination with the additional steps comprising partially vaporizing the withdrawn portion of said solution by heating to form ammonia-rich vapors containing only a minor portion of the acid gas in said withdrawn portion and an unvaporized portion containing the major portion of the acid gas in said withdrawn portion, treating said ammonia-rich vapors as a portion of said impure vapor stream, adding additional water to said unvaporized portion and stripping acid gas therefrom at a higher pressure.

References Cited

UNITED STATES PATENTS 1,012,272  12/1911  Pennock et al. _____ 23—196
2,162,838  6/1939  Cole et al. _____ 23—196
3,193,353  11/1958  Matile et al.

FOREIGN PATENTS 623,095  10/1961  Belgium.

OSCAR R. VERTIZ, *Primary Examiner.*

MILTON WEISSMAN, *Examiner.*

H. S. MILLER, *Assistant Examiner.*